United States Patent [19]
Shih et al.

[11] Patent Number: 5,219,906
[45] Date of Patent: Jun. 15, 1993

[54] LOW BOILING SOLUBILIZER FOR VINYL PYRROLIDONE/ACRYLIC ACID COPOLYMERS

[75] Inventors: Jenn S. Shih, Paramus; Terry E. Smith, Morristown, both of N.J.

[73] Assignee: ISP Investments Inc., Wilmington, Del.

[21] Appl. No.: 862,147

[22] Filed: Apr. 2, 1992

[51] Int. Cl.⁵ .................... C08K 5/05; C08K 5/07
[52] U.S. Cl. ...................... 524/113; 524/304; 524/376; 524/379; 524/388; 524/548; 524/549
[58] Field of Search ........... 524/548, 379, 376, 113, 524/304, 388, 549

[56] References Cited

U.S. PATENT DOCUMENTS

| | | | |
|---|---|---|---|
| 3,405,084 | 10/1968 | Bohae et al. | 524/548 |
| 3,492,253 | 1/1970 | Katz et al. | 524/548 |
| 3,728,319 | 4/1973 | Kiesel et al. | 524/548 X |
| 3,743,715 | 7/1973 | Viout et al. | 524/548 X |
| 4,069,185 | 1/1978 | Sullivan | 524/548 X |
| 4,410,657 | 10/1983 | Loch | 524/548 |
| 4,510,302 | 4/1985 | Kolb et al. | 524/548 X |
| 4,658,002 | 4/1987 | Tschang et al. | 526/88 X |
| 4,680,332 | 7/1987 | Hair et al. | 524/379 X |
| 4,767,613 | 8/1988 | Naber et al. | 524/548 X |
| 4,785,065 | 11/1988 | Uhl et al. | 524/548 X |
| 4,927,667 | 5/1990 | Shih et al. | 524/548 X |
| 5,045,617 | 9/1991 | Shih et al. | 524/548 X |

Primary Examiner—Joseph L. Schofer
Assistant Examiner—Jeffrey T. Smith
Attorney, Agent, or Firm—Marilyn J. Maue; Joshua J. Ward

[57] ABSTRACT

This invention relates to a solubilizing agent for water insoluble vinyl pyrrolidone/acrylic acid copolymers which comprises a mixture of water and an aliphatic oxygen-containing compound having an oxygen to carbon ratio of between about 1:1 and about 0.1:1 combined in a weight ratio of between about 5:1 and about 1:3 water to aliphatic.

9 Claims, No Drawings

LOW BOILING SOLUBILIZER FOR VINYL PYRROLIDONE/ACRYLIC ACID COPOLYMERS

In one aspect this invention provides a solubilizing agent for water insoluble, high molecular weight vinyl pyrrolidone/acrylic acid copolymers. In another aspect, this invention relates to a low boiling solubilizing agent for vinyl pyrrolidone/acrylic acid copolymeric powder which is easily removed during curing operations.

BACKGROUND OF THE INVENTION

High molecular weight, water insoluble vinyl pyrrolidone/acrylic acid (VP/AA) copolymers are important coating and textile sizing agents which are compatible with monovalent inorganic salts, plasticizers and many soluble gums and resins and which possess excellent moisture resistance. These copolymers are also useful in adhesive formulations and display good antideposition properties for reduced soiling of textiles. Additionally, hard, transparent films of these copolymers can be cast for use in photographics or as water proof coatings on paper, metal, textile and plastic surfaces.

Notwithstanding these valuable properties, the utility of VP/AA copolymers has been somewhat limited due to complications encountered in coating operations which derive from their insolubility both in water and in alcohol. Previously, in order to form VP/AA copolymer solutions, it has been the practice to neutralize the copolymer, thus destroying its anionic property, which is responsible for hydrogen bonding and many of the above advantages, or to employ a high boiling solvent, such as dimethyl formamide, N-methyl pyrrolidone, dimethyl acetamide and others. However, such high boiling compounds are impractical for applications involving paper, textiles and many plastics which cannot tolerate the high temperature needed for solvent removal.

Accordingly, it is an object of the present invention to overcome the above difficulties and to extend the utility of VP/AA copolymers to applications involving paper, textiles, plastics and other uses.

Another object of this invention is to provide a low boiling solubilizing agent for VP/AA copolymers having weight average molecular weight of between about 5,000 and 400,000.

These and other objects of the invention will become apparent from the following description and disclosure.

THE INVENTION

In accordance with this invention there is provided a solubilizing composition for normally water insoluble copolymers of vinyl pyrrolidone and acrylic acid which comprises a mixture of water and an oxygen-containing solubilizing agent in a critical weight ratio of between about 5:1 and about 1:3, preferably between about 2:1 and about 1:1.5. The organic solubilizing agents which are contemplated for this invention are oxygen-containing compounds having an oxygen to carbon ratio of from about 1:1 to about 0.1:1, preferably from about 1:1 to about 1:4. Suitable solvents include methanol, ethanol, isopropanol, acetone, ethylene glycol, methyl cellosolve and tetrahydrofuran and mixtures thereof. Of this group, the organic solvents or their mixtures which boil below 125° C. are more desireable and ethanol and isopropanol are most preferred.

The normally insoluble vinyl pyrrolidone/acrylic acid copolymers of this invention are those having a weight average molecular weight of from about 5,000 to about 400,000, preferably between about 80,000 and about 250,000. These copolymers contain units of

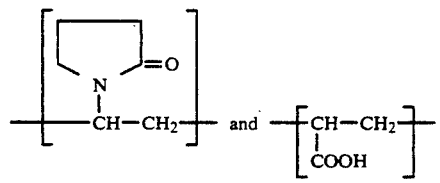

arranged in a random, alternating or block structure. The proportion of vinyl pyrrolidone to acrylic acid can vary between about 20:80 to about 80:20; although the copolymers containing not more than 75 weight % of vinyl pyrrolidone are preferred. These copolymers may optionally contain minor amounts, e.g. less than 10%, of other polymerized monomeric species, for example vinyl acetate, butyl acrylate, ethyl hexyl acrylate, acrylamide and methacrylamide as a terpolymer. Generally, the polymers which have a molecular weight above 100,000 and which contain more than 50% vinyl pyrrolidone are soluble in more dilute alcoholic solutions; whereas the lower molecular weight copolymers containing not more than 50% vinyl pyrrolidone may require more concentrated alcohol solutions.

The weight ratio of solvent to polymer can vary between about 20:1 and about 1:1, however a ratio between about 10:1 and about 4:1 is most desirable.

Solutions of the present copolymers are formed by agitating the polymeric product in the water/solvent mixture for a period of from about 0.5 to about 8 hours at a temperature of from about 20° to about 50° C., preferably under ambient conditions until a desired amount of polymer is dissolved. In accordance with this invention stable polymer solutions containing up to 40 wt. % of dissolved polymer can be obtained.

The prepared solutions can be coated on a surface and cured at low temperature by techniques, without damage to the substrate. Further, the resulting anionic VP/AA polymeric coatings, which retain hydrogen bonding properties, have excellent adherence to the substrate and provide valuable protective coatings.

Having thus described the invention, reference is had to the following examples which illustrate preferred embodiments but which are not to be construed as limiting to the scope of the invention as more broadly set forth above and in the appended claims.

EXAMPLE 1

To 10 grams of VP/AA (75 parts/25 parts) copolymer having a weight average molecular weight of about 110,000, was added 90 grams of a 50/50 water-isopropanol mixture. The resulting mixture was shaken in a glass jar and stirred overnight at room temperature. A liquid solution was obtained with no detectable precipitate.

EXAMPLE 2

Comparative

Example 1 was repeated except that 90 grams of water was used in place of the water-isopropanol solution. After stirring overnight, a gummy polymer was observed on the walls and bottom of the glass jar.

EXAMPLE 3

Comparative

Example 1 was repeated except that 90 grams of isopropanol was used in place of the water-isopropanol mixture. After stirring overnight, a gummy polymer was deposited on the walls and the bottom of the glass jar and suspended ploymer particles were observed in solution.

EXAMPLES 4–7

Into a glass jar containing 10 g of the following VP/AA copolymer was introduced 90 g of the following solvent mixtures. The resulting mixture was shaken and then stirred overnight at ambient temperature. In each case a liquid solution was obtained as reported in the following tabulation

| Ex. | Solvent Mixture | VP/AA Copolymer | Result |
|-----|-----------------|-----------------|--------|
| 4 | $H_2O$/ethanol (60/40) | 75/25 | no precipitate |
| 5 | $H_2O$/ethanol (40/60) | 25/75 | no precipitate |
| 6 | $H_2O$/glycol (60/40) | 75/25 | no precipitate |
| 7 | $H_2O$/methyl cellulose (50/50) | 50/50 | no precipitate |

EXAMPLE 8

The copolymer of Example 1 is coated to a thickness of 20 mils on a sample of soft paper and the coated paper is dried in a vacuum oven overnight at 110° C. The paper is then folded and sealed to form an envelope and is then ¼ filled with water. After 8 hours no water leakage occurred.

EXAMPLE 9

The copolymer of Example 1 is coated to a thickness of 30 mils on an aluminium panel and the coated panel is dried in a vacuum oven overnight at 130° C. The dried panel is uniformly coated with a transparent film which is highly resistant to abrasion.

It will be understood that any of the other solvent mixtures of this invention, including those of examples 4–7, can be used with the VP/AA copolymer and substituted in examples 8 and 9 to provide similar benefits.

What is claimed is:

1. An anionic composition containing a copolymer which is insoluble both in alcohol and in water consisting essentially of vinyl pyrrolidone and acrylic acid in a weight ratio of between about 20:80 and about 80:20 and having a weight average molecular weight of from about 5,000 to about 400,000, which copolymer is dissolved in a mixture of water and an oxygen-containing compound selected from the group of ethanol, isopropanol, acetone, ethylene glycol, methyl cellosolve and tetrahydrofuran or a mixture thereof; said water to oxygen-containing compound mixture having a weight ratio of between 5:1 and 1:3.

2. The composition of claim 1 wherein the copolymer has a weight average molecular weight of from about 80,000 to about 250,000.

3. The composition of claim 1 wherein the weight ratio of water to oxygen-containing compound is between about 2:1 and about 1:1.5.

4. The composition of claim 1 wherein said oxygen-containing compound is isopropanol.

5. The composition of claim 1 wherein said oxygen-containing compound is ethanol.

6. The composition of claim 1 wherein said oxygen-containing compound is ethylene glycol.

7. The composition of claim 1 wherein said oxygen-containing compound is methyl cellulose.

8. The composition of claim 1 wherein the weight ratio of said copolymer to said water and oxygen-containing compound mixture is between about 1:20 and about 1:1.

9. The composition of claim 8 wherein the weight ratio of said copolymer to said water and oxygen-containing compound mixture is between about 1:10 and about 1:4.

* * * * *